(12) United States Patent
Moreno G.

(10) Patent No.: US 7,744,687 B2
(45) Date of Patent: Jun. 29, 2010

(54) INORGANIC AQUEOUS PUTTY OR LIQUID SUSPENSION, THERMALLY INSULATING, NON TOXIC, FIRE RETARDANT

(75) Inventor: Juan Pablo Moreno G., Santiago (CL)

(73) Assignee: International Resin S.A., Macul, Santiago (CL)

( * ) Notice: Subject to any disclaimer, the term of this patent is extended or adjusted under 35 U.S.C. 154(b) by 0 days.

(21) Appl. No.: 11/733,422

(22) Filed: Apr. 10, 2007

(65) Prior Publication Data

US 2007/0234930 A1 Oct. 11, 2007

(30) Foreign Application Priority Data

Apr. 10, 2006 (CL) .................................. 810-2006

(51) Int. Cl.
*C09K 21/02* (2006.01)
*C09D 1/00* (2006.01)
*C09D 1/02* (2006.01)
*C09D 5/18* (2006.01)

(52) U.S. Cl. .............. 106/18.12; 106/15.05; 106/18.11; 106/286.1; 106/286.4; 106/635; 106/801; 252/601; 252/607; 427/397.7; 427/398.8; 427/439; 427/440; 427/443.2

(58) Field of Classification Search .............. 106/15.05, 106/18.11, 18.12, 286.1, 286.4, 635, 801; 252/601, 607; 427/397.7, 397.8, 439, 440, 427/443.2

See application file for complete search history.

(56) References Cited

U.S. PATENT DOCUMENTS 4,359,505 A * 11/1982 Joedicke ..................... 428/404
5,560,769 A * 10/1996 Conner et al. ............... 427/541

FOREIGN PATENT DOCUMENTS

RO 111279 B * 8/1996

* cited by examiner

*Primary Examiner*—Anthony J Green
(74) *Attorney, Agent, or Firm*—Wood, Herron & Evans, L.L.P.

(57) ABSTRACT

The present invention consists of an aqueous putty or liquid suspension, formed by a mix of components a) and b) which are described as follows: a) an anhydrous silicate of an alkaline metal or alkaline terreous, in any of its forms (in dust, particles, granulates or fibers), or a hydrated silicate of an alkaline metal or alkaline terreous (in dust, particles, granulates or fibers), or a mix of both, b) a component of titanium, and optionally, in addition, of components c), d), e) and f), described as follows: c) one or more neutral or acid salts, of mono or poli ammonia, d) fungicide components, e) antibacterial components, and f) odor-controlling components. This putty can be utilized to stop or retard fire, as a coating or incorporated into granulated or aminated components, or in finished moulded products and similar items.

5 Claims, 1 Drawing Sheet

INORGANIC AQUEOUS PUTTY OR LIQUID SUSPENSION, THERMALLY INSULATING, NON TOXIC, FIRE RETARDANT

SUMMARY

While at the present moment there exist numerous formulae's for fire retardant products, these are deficient in their thermal insulation properties, given that heat is transmitted by them towards the face which is not exposed to the fire, resulting in that the temperature at that side will quickly reach the maximum values as specified in the norms and will therefore result in a strongly reduced real resistance to fire. Another inconvenience of existing fire retardant products is that in general these contain organic resins, which when exposed to fire generate toxic fumes.

The thermally insulating inorganic aqueous putty or liquid suspension, intumescent, adhesive, flexible, non toxic fire retardant of this invention is essentially composed of a mix of anhydrous silicates, hydrated by an alkaline metal or alkaline terreous, a component of titanium, neutral salts or ammonium acids, as well as optionally fungicide, antibacterial and odor-controlling components. It is thermally insulating, intumescent, adhesive, flexible and non toxic, which can be incorporated into products or used as a fire retardant coating.

DESCRIPTION OF WHAT IS KNOWN IN THE AREA

While at the present moment there exist numerous formulae's for fire retardant products, the vast majority of these present deficiencies, particularly in relation to their thermal insulation properties, given that in general heat is transmitted by them towards the face which is not exposed to the fire, resulting in that the temperature at that side will quickly reach the maximum values as specified in most national and international codes or norms, therefore resulting in a strongly reduced resistance to fire. Another inconvenience of existing fire retardant products is that in general these contain organic resins, which are inherently combustible and which when exposed to fire, as a result of the elevated temperatures produce fumes and gases which are generally toxic.

An additional inconvenience of existing fire retardants, on top of the toxicity of the gases that these generate when coming in contact with fire, is that these gases propagate through small slots towards the side which is not exposed to the fire, thereby directly affecting the people it should help protect.

A further inconvenience of existing fire retardants is shown in the surface burning characteristics tests of construction material, as those performed under the ANSI/UL 723 standard, dated Aug. 29, 2003, (ASTM E-84), which determines the surface burning characteristics of material, specifically the flame spread and smoke development of material when exposed to fire. These values are shown in percentages and in relation to the burning of a standardized set pattern known as "Douglas Fur Decks", which are given the value of "100" when burnt without any coating and "zero" when the protection applied does not result in any flame spread or smoke development whatsoever. When the surface of this standardized material is protected with a coating, its protective effect is shown by a reduced value in these indexes and given a "Category B" when these indexes are between 75% and 25%, and a "Category A" when these indexes are equal or less than 25%. According to available information, until the present day none of the products which have undergone this test have obtained an index lower than 26%, that is, achieved a "Category A".

Given that the majority of fire retardants are used to protect wood, in many cases fungicides, antibacterial and odor-controlling components of different concentrations are added to the fire retardants in order to obtain the specific required results.

Figure 1:
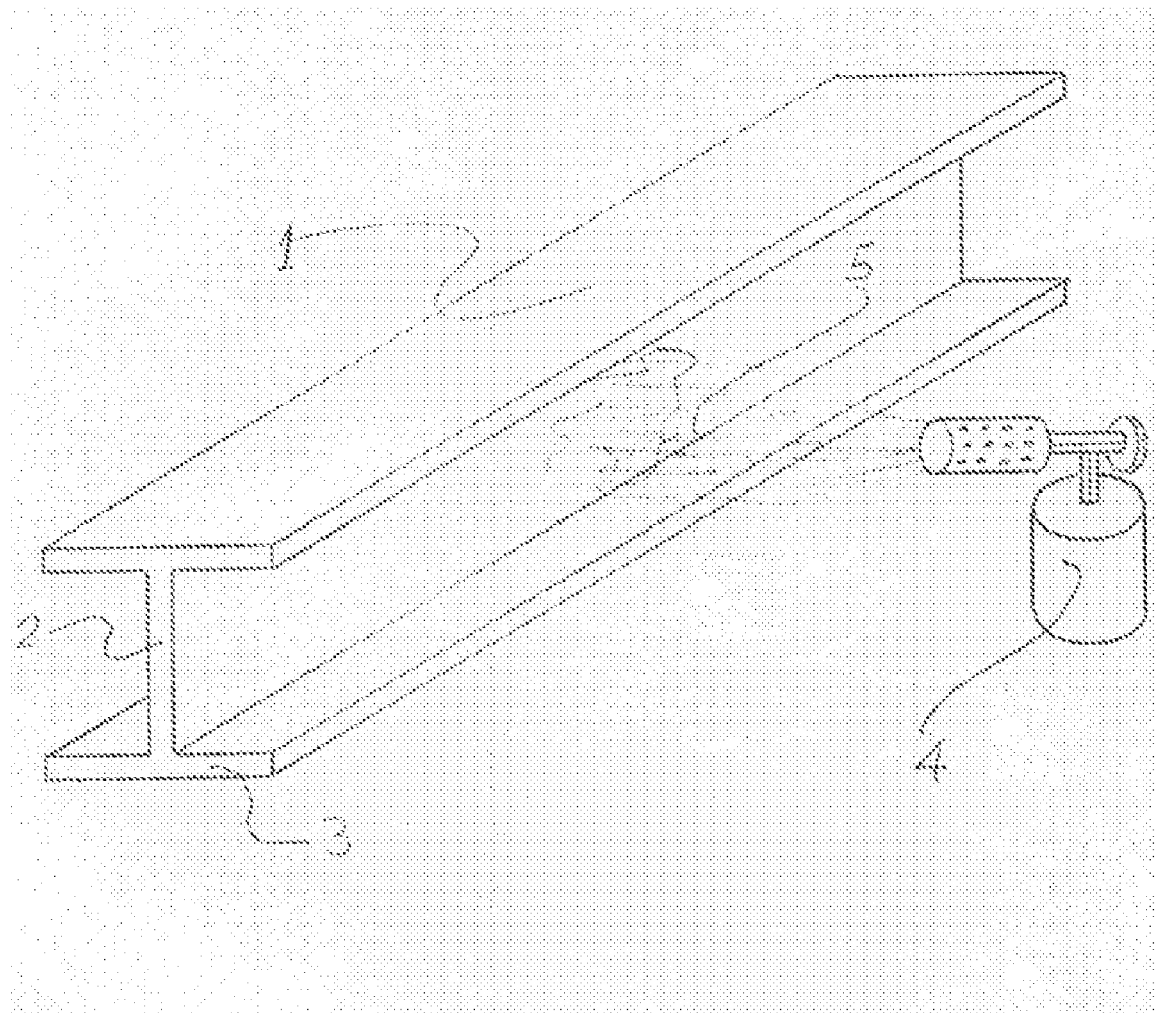
FIG. 1 shows a schematic isometric view of a wooden double T-joist, coated with the fire retardant putty of this invention, being fire-tested by means of a direct application of flame from a liquid gas burner.

The numbers indicating the details in the figure have the following meaning:
1. Superior wing on the double T-joist
2. Core of the double T-joist
3. Inferior wing of the double T-joist
4. Liquid gas burner
5. flame applied directly to the center of the double T-joist

DESCRIPTION OF THE INVENTION

The present invention consists of an aqueous putty or liquid suspension, formed by a mix of components a) and b) which are described as follows:
  a) An anhydrous silicate of an alkaline metal or alkaline terreous, in any of its forms (in dust, particles, granulates or fibers), or a hydrated silicate of an alkaline metal or alkaline terreous (in dust, particles, granulates or fibers), or a mix of both.
  b) A component of titanium, such as of the rutile type.

and optionally, in addition, of components c), d), e) and f), described as follows:
  c) one or more neutral or acid salts, of mono or poli ammonia (preferably those of bromides, sulphates and phosphates)
  d) fungicide components
  e) antibacterial components
  f) odor-controlling components.

This putty can be utilized to stop or retard fire, as a coating or incorporated into granulated or laminated components, such as joists, wooden boards known as oriented strand board (OSB), plywood, particle board, medium density fiberboard (MDF), high density fiberboard (HDF), hard board, fiber silicate mineral board, gypsum board, panels, or in finished moulded products like moulded door skins, furniture and similar items.

With regards to the silicates, those of sodium or magnesium are preferred. In case of the sodium silicate, by preference one of aqueous suspension is utilized, in a mix of equal parts of dust silicates, both anhydrous and hydrated. In case that the desired application is that of a coating, fiberglass fibers of different lengths and calibers are added, for the purposes of improving the mechanical resistance of the given coating.

With regards to the ammonium salts, the bromides, sulphates and phosphates are preferably utilized in approximate proportions of one to two in weight, with relation to the sum of the total of silicates and titanium salts.

With regards to the fungicide, antibacterial and odor-controlling components, these are adjusted in each case according to the specific purposes for which these are used, in generally not surpassing 10% of the total weight of the batch produced. In one example, the fungicide used in the fire retardant mix for coating or impregnation of wood or other material is boric acid in proportions ranging between 5% to 15% of the total weight of the mix.

EXAMPLE OF AN APPLICATION

For the purposes of testing the virtues of this invention, a 10 kg batch of putty was prepared in a recipient, with the following approximate compositions:
Anhydrous sodium silicate 1 Kg
Hydrated sodium silicate 2 Kg
Anhydrous magnesium silicate 1 Kg
Titanium dioxide 2 Kg
Ammonium bromide 1 Kg
Ammonium sulphate 1 Kg
Di-ammonious phosphate 1 Kg
Fibers of fiberglass of irregular lengths 1 Kg
Water 2 liters Once all components were added, the mix was homogenized by manual stirring.

After a one day rest period for the mix to settle, the putty was applied with a spatula over the wooden double T-joist of 1 meter length and 25 cm width for both the core and external wings, all of which 2.5 cm in thickness.

One week after the joist was coated, a liquid gas burner was lit and placed at 30 cm distance from the core of the joist. The flame remained impacting the core of the joist for over two hours, without the joist ever catching fire or the coating being burnt. The temperature at the rear side remained sufficiently low so as to place one's hand over it and not get burnt. There was also no flame spread nor smoke development of any gases as a result of the resulting swelling of the coating.

These results have subsequently been confirmed in an official surface burning characteristics test performed by Underwriters Laboratories, certifying a flame spread of zero and smoke development of 1.4%, the latter corresponding to an index of zero in the smoke development index.

What is claimed is:

1. A fire retardant mix for coating or impregnation of wood and construction boards, wherein it contains anhydrous or hydrated silicates of an alkaline metal or alkaline terreous, or a mix of both, titanium dioxide and one or more neutral or acid salts of a poli ammonia, and containing optionally fungicide, antibacterial and odor-controlling components, wherein the salts of the ammonia used are those of bromides, sulphates and phosphates and the fire-retardant mix for coating or impregnation of wood and construction boards is inorganic.

2. A fire retardant mix for coating or impregnation of wood and construction boards, as in claim 1, wherein the anhydrous silicates of an alkaline metal or alkaline terreous are fibers.

3. A fire retardant mix for coating or impregnation of wood and construction boards, as in claim 1, wherein the fire retardant mix includes the fungicide which is boric acid in proportions ranging between 5% to 15% of the total weight of the mix.

4. A fire retardant mix for coating or impregnation of wood and constructions boards, as in claim 1, wherein the silicates used are those of sodium, potassium and magnesium.

5. A method of using the fire retardant mix of claim 1 for coating or impregnation of wood and construction boards comprising:
    coating the fire retardant mix onto or incorporating the fire retardant mix into granulated or laminated wood components, joists, wooden boards known as oriented strand board (OSB), plywood, particle board, medium density fiberboard (MDF), high density fiberboard (HDF), hard board, fiber silicate mineral board, gypsum board, panels, or finished moulded products, moulded door skins, and furniture.

* * * * *